United States Patent
Arvinte et al.

(10) Patent No.: US 10,312,977 B2
(45) Date of Patent: Jun. 4, 2019

(54) COMPLEXITY REDUCTION FOR RECEIVER DECODING

(71) Applicant: Freescale Semiconductor, Inc., Austin, TX (US)

(72) Inventors: Marius Octavian Arvinte, Focsani (RO); Wim Joseph Rouwet, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/668,345

(22) Filed: Aug. 3, 2017

(65) Prior Publication Data

US 2018/0323836 A1    Nov. 8, 2018

(30) Foreign Application Priority Data

May 8, 2017    (RO) .............................. A/00274/2017

(51) Int. Cl.
| | | |
|---|---|---|
| H04B 7/04 | (2017.01) | |
| H04B 7/0417 | (2017.01) | |
| H04B 7/0452 | (2017.01) | |
| H04L 1/00 | (2006.01) | |

(52) U.S. Cl.
CPC ......... *H04B 7/0417* (2013.01); *H04B 7/0452* (2013.01); *H04L 1/0048* (2013.01)

(58) Field of Classification Search
CPC .... H04B 7/0417; H04B 7/0452; H04L 1/0048
See application file for complete search history.

(56) References Cited

U.S. PATENT DOCUMENTS

| | | | | |
|---|---|---|---|---|
| 5,966,412 A | * | 10/1999 | Ramaswamy | ........ H04L 1/0054 375/261 |
| 6,516,037 B1 | * | 2/2003 | Wei | ..................... H03M 13/098 375/264 |
| 7,978,798 B2 | | 7/2011 | Hwang et al. | |
| 8,644,407 B2 | * | 2/2014 | Qu | ......................... H04L 1/0625 375/259 |
| 9,838,225 B1 | * | 12/2017 | Iranzo Molinero | ......................... H04L 25/0204 |
| 9,979,577 B2 | * | 5/2018 | Naim | ................... H04L 27/2602 |
| 2009/0042511 A1 | * | 2/2009 | Malladi | .................... H04L 5/023 455/62 |
| 2009/0097401 A1 | * | 4/2009 | Diab | ........................ H04L 29/06 370/230 |

(Continued)

OTHER PUBLICATIONS

Im, T., et al., "MMSE-OSIC2 Signal Detection for Spatially Multiplexed MIMO Systems", Vehicular Technology Conference, 2008, 5 pages.

(Continued)

Primary Examiner — Jean B Corrielus

(57) ABSTRACT

A receiver decodes received data streams based on a subset of candidate decoding constellation points. A first stage of a decoder of the receiver selects a subset of candidate decoding constellation points by identifying a decoded value for an initial data stream of the set of data streams. A second stage then applies MMSE error detection to each of the constellation points in the selected subset, and calculates an error metric based on the MMSE error detection results. The decoder selects the constellation points having the lowest error metrics, and uses the selected constellation points as an initial set of points for decoding the next data stream to be decoded.

9 Claims, 3 Drawing Sheets

(56) References Cited

U.S. PATENT DOCUMENTS

| | | | |
|---|---|---|---|
| 2011/0069776 A1 | 3/2011 | Huang et al. | |
| 2012/0051469 A1* | 3/2012 | Gamage | H04L 25/067 375/341 |
| 2012/0219097 A1* | 8/2012 | McCloud | H04L 25/03242 375/341 |
| 2014/0153672 A1* | 6/2014 | Zhao | H04L 27/3416 375/320 |
| 2014/0294114 A1* | 10/2014 | Rege | H04B 15/00 375/285 |

OTHER PUBLICATIONS

Jiang, Y., et al., "Performance Analysis of ZF and MMSE Equalizers for MIMO Systems: An In-Depth Study of the High SNR Regime", Globecom, 2005, 40 pages.

\* cited by examiner

COMPLEXITY REDUCTION FOR RECEIVER DECODING

BACKGROUND

Field of the Disclosure

The present disclosure relates generally to data communication and more particularly to data receivers.

Description of the Related Art

Communication networks typically employ receivers to identify and decode transmitted information at endpoints of the network. For example, cellular networks employ receivers at user equipment (e.g., mobile handsets) to receive data transmitted at one or more base stations. To facilitate more reliable and efficient communication, the base stations sometimes use multiple-input multiple-output (MIMO) transmitters to take advantage of communication features such as multipath propagation. The MIMO transmitter includes multiple communication channels, with each channel transmitting data to a corresponding user equipment. However, the different signals transmitted via the multiple channels can interfere with each other, thereby complicating the user equipment receiver's task of identifying and decoding the data corresponding to the channel associated with the particular user equipment. Conventional signal decoding techniques are computation-intensive, and therefore consume an undesirably large amount of power and other receiver resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
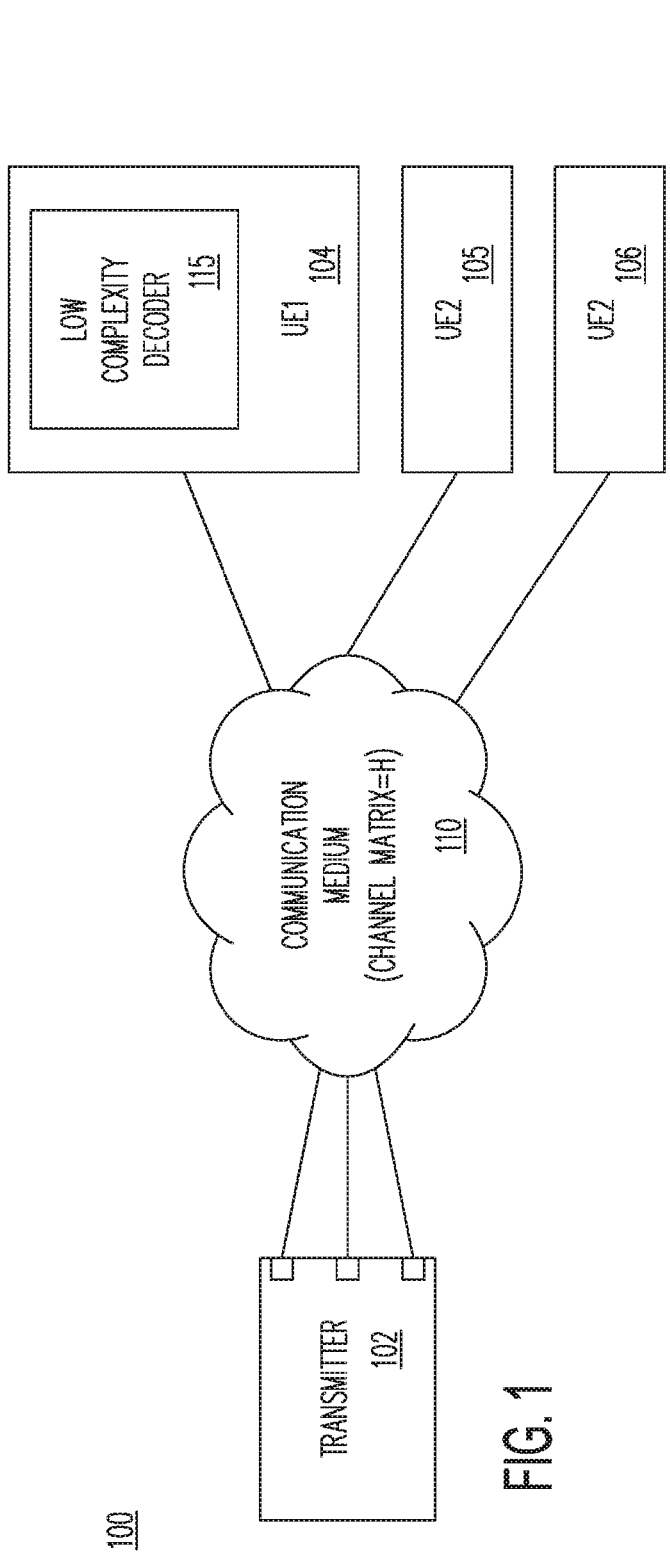
FIG. 1 is a block diagram of a communication network that employs a receiver configured to decode received signals based on a subset of decoding constellation points in accordance with at least one embodiment.

FIGS. 1-4 illustrate techniques for decoding a set of data streams received at a receiver, such as a data stream transmitted by a multi-user multiple-input multiple output (MIMO) transmitter of a cellular network, based on a subset of candidate decoding constellation points. For example, a first stage of a decoder receiver can select a subset of candidate decoding constellation points by identifying a decoded value for an initial data stream of the set of data streams. In some embodiments, the first stage selects the subset of constellation points using minimum mean square error (MMSE) detection, then selects the subset of points that are closest (within a squared Euclidean distance) to the decoded value. A second stage then applies MMSE error detection to each of the constellation points in the selected subset, and calculates an error metric based on the MMSE error detection results. The decoder selects the constellation points having the lowest error metrics, and uses the selected constellation points as an initial set of points for decoding the next data stream to be decoded. Thus, the decoder employs a reduced set of constellation points for decoding the set of data streams, thereby reducing the number of computations required for accurate decoding and thus conserving system resources.

To illustrate the reduction in the number of computations further via an example, in a typical MIMO system, the transmitter includes $N_t$ transmitting antennas transmitting a plurality of data streams to $N_r$ receiving antennas. The plurality of data streams will interfere with each other and that must be compensated for in order to ensure proper decoding at the user equipment. One technique compensates for the interference at the receiver decoder. In particular, the transmission of data streams in the MIMO system can be characterized by the following equation:

$$y = Hx + n$$

where x, y and n are column vectors of lengths $N_t$, $N_r$ and $N_r$ respectively and H is the MIMO channel matrix of size $N_r \times N_t$. The MIMO channel matrix H is based in part characteristics of the transmission medium used to communicate the plurality of data streams. The matrix x represents the data being transmitted via the plurality of data streams. The matrix n represents noise associated with the transmission and reception of the data, and the matrix y represents the data as it is received at the receive antennas.

The goal of the receiver is to process the H and y matrices to generate a matrix $x_{est}$ that is as close as possible to the matrix x (and therefore as close as possible to the originally transmitted data). The transmitted data can be represented as constellation points in a fixed constellation, such as a 16 or 64 quadrature amplitude modulation (QAM) transmission scheme. For example, in one embodiment the constellation points can be represent in a constellation diagram, which in turn is a representation of a signal modulated by a digital modulation scheme. The constellation diagram displays the signal as a two-dimensional xy-plane scatter diagram in the complex plane at symbol sampling instants. Thus, the constellation points represent possible symbols that may be selected by a given modulation scheme as points in the complex plane.

Accordingly, the goal of the decoder is to find the constellation point that is closest to the constellation point corresponding to the transmitted data. Conventionally, the receiver decoder employs a maximum likelihood (ML) algorithm, wherein the decoder compares all possible constellation points (referred to herein as "candidate constellation points") to the received data and selects the point that produces the smallest error. However, the ML algorithm requires calculating an error value for all possible constellation points, and the number of computations required to complete the algorithm grows exponentially with the number of transmit and receive antennas (which govern the size of the different matrices).

In contrast to the conventional algorithm, the techniques described herein do not employ the entire set of candidate constellation points to decode the received data streams. Instead, the decoder identifies a subset of the candidate constellation points, wherein a subset, as used herein, is defined as a set having less than all the members of the set that contains the subset. Thus, a subset of the set of all candidate constellation points contains fewer constellation points than the set of all candidate constellation points. In at least one embodiment, the decoder selects the subset of candidate constellation points based on the squared Euclidean distance of the candidate constellation points to the received data. That is, the decoder selects only those candidate constellation points that are within a threshold distance of the received data. The decoder thereby reduces the number of calculations needed to identify the constellation point corresponding to the received data while still providing relatively accurate identification of the constellation point.

FIG. 1 illustrates a block diagram of a portion of a communications network 100 including a transmitter 102, user equipment (UE) 104, 105, and 106, and a communication medium 110. In one embodiment the communication network 100 is a WiFi network that complies with an 802.11xx network standard. In another embodiment the transmitter 102 is a multi-user multiple-input multiple output (MU MIMO) transmitter incorporated in or co-located with a base station, such as an Evolved Node B (eNodeB) of an LTE network, and that the UEs 104-106 are each mobile handsets, such as compute-enabled mobile phones. In other embodiments, the transmitter 102 is incorporated or collocated with a wireless router device.

As indicated above, the transmitter 102 is a MU MIMO transmitter generally configured to receive data from another portion (not shown) of the cellular network, the data representing information individually targeted to different ones of the UEs 104-106. The transmitter 102 negotiates with each of the UEs 104 to 106 to establish user-specific communication channels (referred to herein as channels) with each UE, and communicates data to each of the UEs 104-106 over the corresponding channel and via the communication medium 110. Thus, in the illustrated example, the transmitter 102 establishes different communication channels to communicate data to UE 104, UE 105, and UE 106, respectively. In at least one embodiment, the transmitter 102 includes a plurality of antennas (not shown at FIG. 1) to send data over the communication medium 110, with each channel including multiple ones of the plurality of antennas. For example, in at least one embodiment each channel includes at least two antennas to communicate data, thereby supporting more reliable communication with the UEs 104-106. Further, in at least some embodiments, the transmitter 102 communicates multiple independent streams of data to each of the UEs 104-106. Thus, for example, the transmitter 102 can concurrently transmit three independent streams of data to UE 104, four independent streams of data to UE 105, and one stream of data to UE 106.

In at least one embodiment, the transmitter 102 is configured to multiple streams of data to at least one user equipment concurrently. This concurrent transmission of data streams can cause cross-stream interference, reducing the reliability of the communicated data. Accordingly, to reduce cross-stream interference, the UE 104 includes a decoder 115 generally configured to decode the data for each of the data streams. In particular, the decoder 115 proceeds as follows: first the decoder 115 identifies the channel matrix H for the transmission medium 110. In at least one embodiment, the transmitter 102 determines the channel matrix H and communicates the matrix to the UE 104. For example, the transmitter 102 can determine the channel matrix H by sending one or more test signals to the UEs 104-106 for each of the data streams, receiving responsive test information from each of the UEs 104-106, and generating the channel matrix H based on the responsive test information using one or more conventional techniques. In at least one other embodiment, the transmitter 102 estimates the channel matrix H based on stored characteristics of the communication medium. In still another embodiment, the transmitter 102 generates the channel matrix H based on a combination of stored characteristics and test results from transmission of one or more test signals.

Each column of the channel matrix H corresponds to a different data stream, sometimes referred to herein as a layer. The decoder 115 orders the layers based on the norm of the corresponding column of the channel matrix H. The decoder 115 then proceeds through the ordered layers in descending order. For the initial layer, the decoder 115 preprocesses the data using a relatively simple MMSE detection technique, thereby identifying a subset Q having $Q_i$ candidate constellation points from the set C of all candidate constellation points (e.g., the set C of sixty four candidate constellation points in a system that employs 64-QAM). The decoder 115 then computes an error metric for each of the $Q_i$ candidate constellation points based on their difference to the estimated data value for the current layer. Based on the calculated error metrics, the decoder 115 selects the best $M_i$ constellation points. The decoder 115 then proceeds to the next layer, using the $M_i$ candidate constellation points to identify the next subset Q. As the decoder 115 proceeds through the layers, it identifies the subset Q for that layer based on the $M_i$ points from the previous layer, thereby successively reducing the number of constellation points that have to be compared to identify the subset Q and reducing the number of overall calculations to decode the data for each layer.

In at least one embodiment, after identifying the candidate constellation points $M_i$ for each layer, the decoder 115 selects one of the candidate constellation points from the corresponding set M, with the selected constellation point representing the decoded data for the stream corresponding to the layer. In at least one embodiment, the decoder 115 selects the candidate constellation points that have the lowest error metric relative to the data for the corresponding stream, as described further herein. The decoder 115 thus identifies a data value for each of the received data streams using subsets of candidate constellation points, rather than the entire set of constellation points for each layer, thereby conserving system resources such as power.

Figure 2:
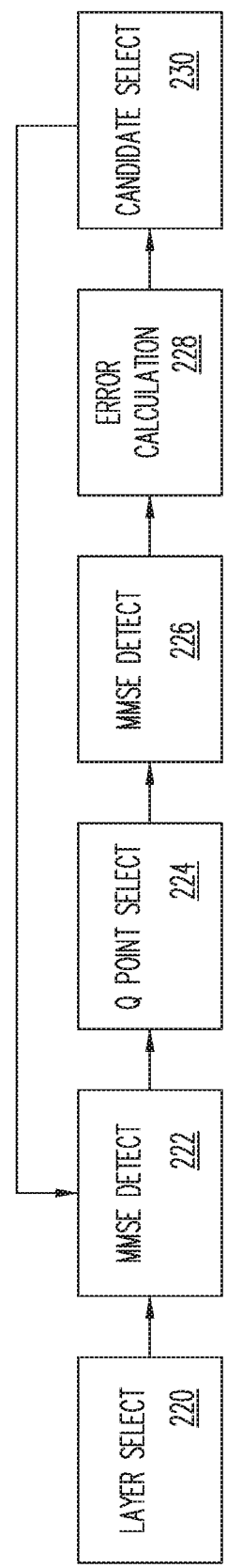
FIG. 2 is a diagram illustrating the decoder of a receiver of FIG. 1 in accordance with at least one embodiment.

FIG. 2 illustrates the decoder 115 in accordance with at least one embodiment. In the depicted example, the decoder 115 includes a layer select module 220, an MMSE detection module 222, a Q point selection module 224, an MMSE detection module 226, an error calculation module 228, and a candidate selection module 230. The layer select module 220 is generally configured to select the layers corresponding to the received streams in descending order according to the norm of the column of the channel matrix H.

The MMSE detection module 222 performs MMSE detection for the current layer selected by the layer select module 220. In at least one embodiment, the MMSE 222 module calculates the minimum mean squared error, relative to the received data for the current stream, for each of the M candidate constellation points identified for the previous layer. For the first layer, the M candidate constellation points can correspond to the set C of all candidate constellation points. In at least one embodiment, the MMSE for the mth candidate of the kth layer is calculated according to the following formula:

$$x_{m,k} = W_{k:Nt} y = (H_{k:Nt}^H H_{k:Nt} + \sigma^2 I)^{-1} H_{k:Nt}^H y$$

where $x_{m,k}$ is the MMSE decoded symbol for the mth candidate of the kth layer, $H_{k:Nt}$ is the partial channel matrix for the kth layer, wherein the partial channel matrix is formed by discarding the first k−1 columns of the channel matrix H and keeping the remaining columns, $\sigma^2$ is the noise power for the receiver, I is the identity matrix of size Nt by Nt, and y is the matrix of received data.

The Q point select module 224 selects, for each of the M candidates, a threshold number of candidate constellation points $Q_i$ based on their squared Euclidean distance from the point $x_{m,k}$. In at least one embodiment the threshold number, designated for purposes of description as a threshold R is a programmable value that can be set to different values for different receivers, or can be set to different values based on different criteria such as receiver operating conditions, a power mode of the receiver, and the like. In at least one embodiment, the threshold R can vary based on the currently selected layer. For example, in at least one embodiment the threshold R is lower for the initial layers (e.g., layers 1 and 2) than for subsequent layers, thereby simplifying identification of the $Q_i$ constellation points for the initial layers when the number of M candidates is larger.

The MMSE detection module 226 is configured to, for each of the $Q_i$ constellation points selected by the Q point selection module 224, perform MMSE detection for the remaining layers. In at least one embodiment, the MMSE detection module 226 performs MMSE detection according to the following formula:

$$x_{m,q[k+1:Nt]} = W_{[k+1:Nt]} y$$

where W is set forth above in the formula for the MMSE detection module 222, and $N_t$ is the number of transmit antennas at the transmitter 102 (FIG. 1).

The error calculation module 228 is a module configured to calculate an error value for each of the $Q_i$ points, indicating how far the MMSE value corresponding to the $Q_i$ point varies from the received data. In at least one embodiment, the error calculation module 228 calculates the error value according to the following formula:

$$d_{m,q} = \|Hx\_(m,q) - y\|^2$$

where $d_{m,q}$ is the error value for the candidate constellation point q as derived from the current set m of candidate constellation points.

The candidate select module 230 is configured to select, from the current set Q, a threshold number of candidate constellation points having the lowest error values as calculated by the error calculation module 228. In at least one embodiment, the threshold number of candidate constellation points, designated threshold Z for purposes of description, can be a programmable value. In at least one embodiment, the threshold Z can be adjusted based on one or more variable criteria, such as a power mode of the UE 104. The candidate select module 230 provides the selected candidate constellation points to the MMSE detection module 222, which uses the selected candidate constellation points as the matrix M for the next layer as selected by the layer select module 220.

The decoder 115 proceeds through all layers of the received data streams, such that the candidate select module 230 identifies a set of candidate constellation points for each layer. For each layer, the candidate select module 230 identifies the candidate constellation point having the lowest error value, as calculated by the error calculation module 228, as the decoded data for that layer. Thus, the candidate select module selects a single constellation point for each received data stream, and stores the selected constellation point as the received data for the data stream. The stored data can be accessed by other modules (not shown) of the UE 104 to process the received data, such as forming the data for each received data stream into packets or other data units, performing error detection and correction on the received data, and the like.

Figure 3:
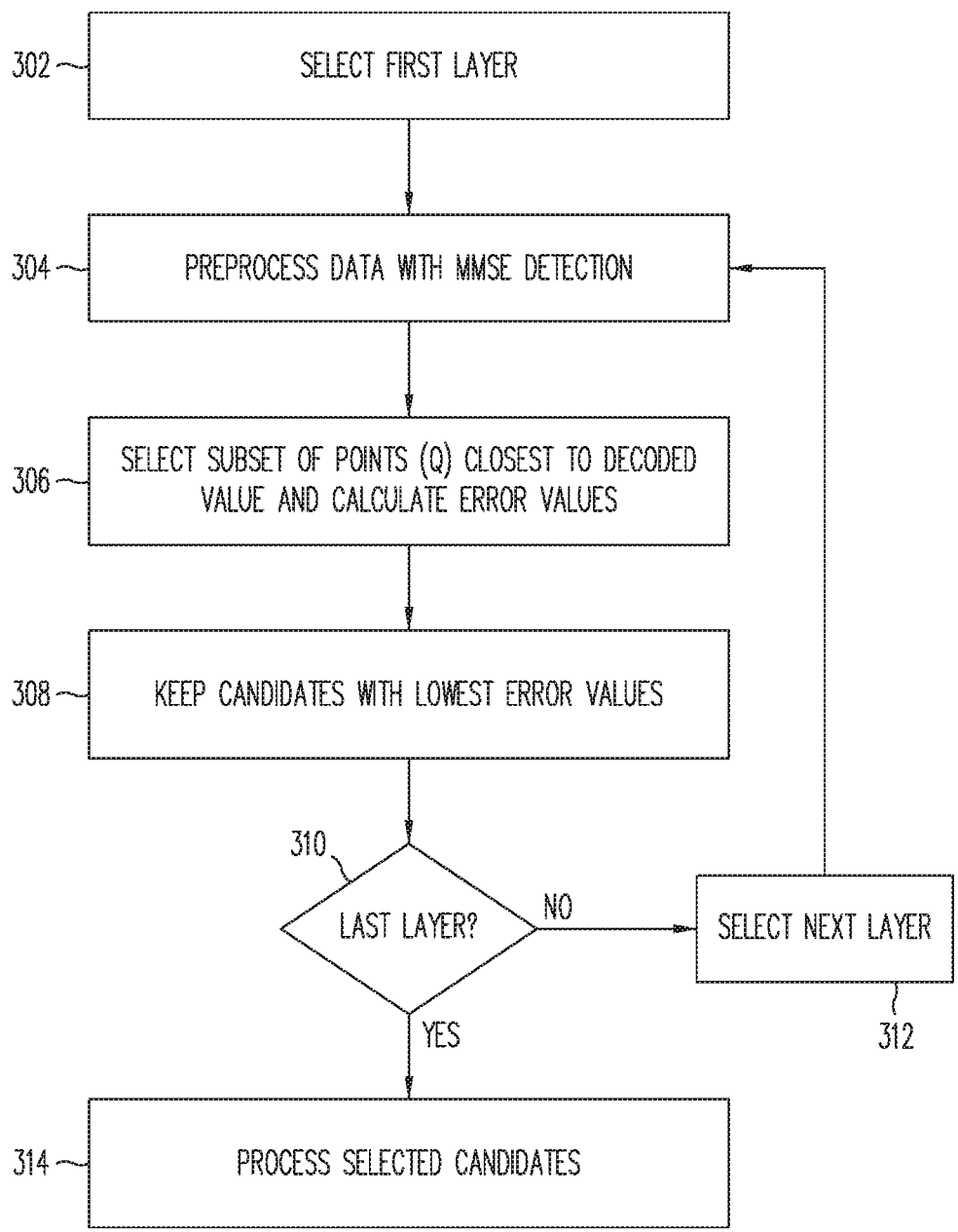
FIG. 3 is a flow diagram of a method of decoding received signals based on a subset of decoding constellation points in accordance with at least one embodiment.

FIG. 3 illustrates a flow diagram of a method 300 of decoding data at a receiver based on a subset of candidate constellation points in accordance with at least one embodiment. For purposes of description, the method 300 is described with respect to an example implementation at the decoder 115 illustrated at FIG. 2. At block 302, the layer select module 220 selects a first layer from a plurality of ordered layers. As explained above, each layer corresponds to a different one of a plurality of data streams received at the UE 104. In at least one embodiment, each of the plurality of data streams (and therefore each of the plurality of layers) corresponds to a column in the channel matrix H associated with the communication medium 110 over which the data streams are transmitted. The layer select module 220 calculates the norm for each column of the channel matrix H, and orders the layers in descending order according to their corresponding norms. Thus, at block 302, the layer select module 220 selects the first layer in the descending order.

At block 304 the MMSE detection module 222 performs MMSE detection for the selected layer. In at least one embodiment, the MMSE detection module 222 performs MMSE detection for each of M candidate constellation points calculated for the previous layer. At block 306 the Q point select module 224 calculates selects a threshold number of the M candidate constellation points that are closest to the received data for the currently selected layer and stores the selected candidate constellation points as a subset Q. In at least one embodiment threshold number is a fixed number. In other embodiments the threshold number is adjusted based on a programmed value, based on the number of the currently selected layer, based on operating conditions of the UE 104, based on a power mode of the UE 104, and the like, or any combination thereof. In addition, at block 306 the MMSE detection module 226 and error calculation module 228 calculate error values for each of the candidate constellation points in the subset Q.

At block 308 the candidate select module 230 selects a threshold number of candidate constellation points having the lowest error values as calculated at block 228. In at least one embodiment threshold number is a fixed number. In other embodiments the threshold number is adjusted based on a programmed value, based on the number of the currently selected layer, based on operating conditions of the UE 104, based on a power mode of the UE 104, and the like, or any combination thereof. The candidate select module 230 stores the selected candidate constellation points as a subset M to be used for the next layer.

At block 310 the candidate select module 230 determines whether the currently selected layer is the last layer in the set of ordered layers. If not, the method flow moves to block 312 and the layer select module 220 selects the next layer in the set of ordered layers. The method flow returns to block 304 and the MMSE detection module 222 performs MMSE detection for each of M candidate constellation points calculated for the previous layer as described above. Returning to block 310, in response to determining that error values have been calculated for all layers in the ordered set, the method flow moves to block 314 and the candidate select module selects, for each layer, the candidate constellation point having the lowest error value and stores that constellation point as the received data for that layer and corresponding communication stream. The UE 104 can then further process the received data by, for example, forming the data into packets or other data units, performing error detection and correction on sets of received data, and the like.

Figure 4:
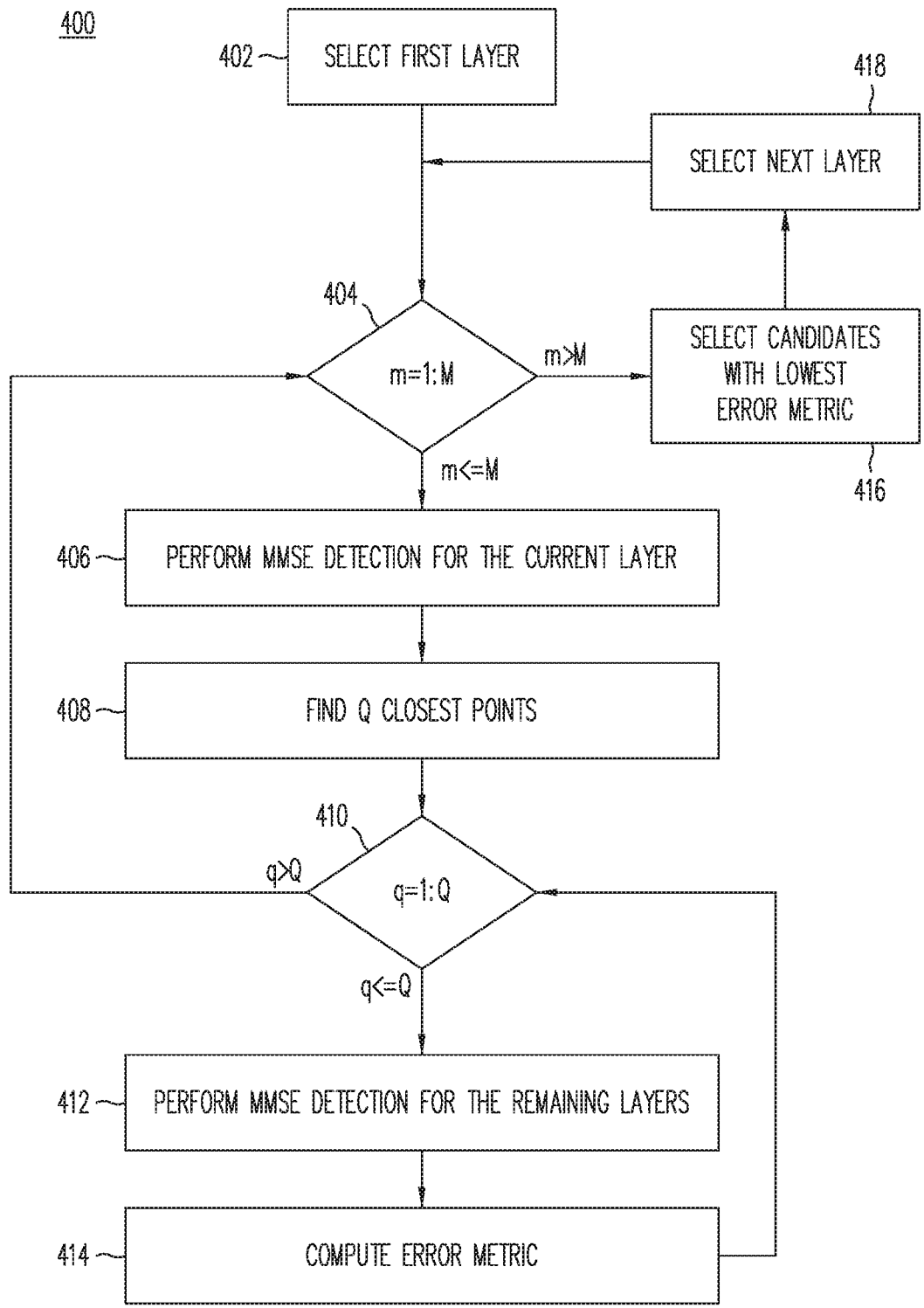
FIG. 4 is a flow diagram of a method of identifying a subset of decoding constellation points for received signals in accordance with at least one embodiment.

FIG. 4 is a flow diagram of a method 400 of identifying a subset of decoding constellation points for received signals in accordance with at least one embodiment. For purposes of description, the method 300 is described with respect to an example implementation at the decoder 115 illustrated at FIG. 2. At block 402, the layer select module 220 selects a first layer from a plurality of ordered layers. As explained above, each layer corresponds to a different one of a plurality of data streams received at the UE 104, and the plurality of layers are ordered in descending order according to the norms of the corresponding columns in the channel matrix H. Thus, at block 402, the layer select module 220 selects the first layer in the descending order.

At block 404 the decoder 115 begins proceeding through the set M of candidate constellation points for the currently selected layer. In at least one embodiment, the set M is generated from candidate constellation points for the previous layer as described further herein. The procession through the set M is governed in the illustrated example by a variable designated "m." While m is less or equal to M (that is, is less than the total number of candidate constellation points in the set M), the method flow moves to block 406 and the MMSE detection module 222 performs MMSE detection for the mth constellation point of the set M, according to the formula set forth above. At block 408 the Q point select module 224 calculates selects a threshold number of the candidate constellation points in the set M that are closest to the received data for the currently selected layer and stores the selected candidate constellation points as a subset Q. In at least one embodiment threshold number is a fixed number. In other embodiments the threshold number is adjusted based on a programmed value, based on the number of the currently selected layer, based on operating conditions of the UE 104, based on a power mode of the UE 104, and the like, or any combination thereof.

At block 410 the decoder 115 begins proceeding through the subset Q of candidate constellation points. The procession through the set is governed in the illustrated example by a variable designated "q." While q is less or equal to Q (that is, is less than the total number of candidate constellation points in the subset Q), the method flow moves to block 412 and the MMSE detection module 226 performs MMSE detection for the qth constellation point of the subset Q, according to the formula set forth above. At block 414 the error calculation module 228 computes the error metric for the qth constellation point based on the MMSE detection at block 412. The method returns to block 410, and the error calculation module increments the variable q by one.

At block 410, in response to the variable q being greater than Q (indicating that MMSE detection has been performed and error metrics calculated for all candidate constellation points of the set Q), the method flow returns to block 404 and the error calculation module 228 adds one to the variable m. In response to the variable m being greater than M (indicating that MMSE detection and identification of subsets Q has been completed for all of the candidate constellation points of the set M), the method flow moves to block 416 and the candidate select module 230 selects a threshold number of candidate constellation points have lower error metric values, as calculated at block 414, and stores the selected constellation points as the set M to be used for the next layer. The method flow moves to block 418 and the layer select module 220 determines whether a threshold number of constellation points have been identified for each layer. If not, the layer select module 220 selects the next layer and the method flow returns to block 404. If, at block 418, the layer select module 220 determines that a threshold number of constellation points have been identified for each layer, the candidate select module 230 identifies, for each layer, the candidate constellation point having the lowest error metric and stores the identified candidate constellation point as the decoded data value for that layer and corresponding data stream.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving a plurality of data streams at a receiver, the plurality of data streams comprising a first data stream and a second data stream, each of the plurality of data streams representing a different transmitted data stream;
decoding the first data stream based on a set of candidate constellation points indicating potential symbol values for the first data stream;
selecting a first subset of the set of candidate constellation points, wherein selecting the first subset comprises
generating, for each of the set of candidate constellation points, a corresponding first detection value,
selecting a second subset based on a distance between candidate constellation points of the set of candidate constellation points and the first detection value, and
selecting the first subset from the second subset; and
decoding the second stream based on the first subset of the set of candidate constellation points.

2. The method of claim 1, wherein generating the first detection value comprises generating the first detection value based on minimum mean squared error (MMSE).

3. The method of claim 1, wherein selecting the second subset comprises selecting a threshold number of candidate constellation points from the set of candidate constellation points.

4. The method of claim 3, wherein the threshold is based on a location of the first stream in an order of the plurality of data streams.

5. The method of claim 4, further comprising:
generating the order of the plurality of data streams based on a channel matrix associated with the receiver.

6. The method of claim 1, wherein selecting the second subset comprises:

generating, for each candidate constellation point of the first subset, a corresponding second detection value;
calculating a corresponding error metric for each element of the first subset based on the corresponding second detection value; and
selecting the second subset based on the calculated error metrics.

7. The method of claim 6, wherein calculating the corresponding error metric comprises calculating the error metric according to the formula:

$$d=\|Hx\_-y\|^2$$

where d is the error metric, H is a channel matrix associated with the receiver, x is the corresponding second detection value, and y is data received via the second data stream.

8. A method comprising:
receiving a plurality of data streams at a receiver, the plurality of data streams comprising a first data stream, a second data stream, and a third data stream, each of the plurality of data streams representing a different transmitted data stream;
decoding the first data stream based on a set of candidate constellation points indicating potential symbol values for the first data stream;
selecting a first subset of the set of candidate constellation points;
decoding the second stream based on the first subset of the set of candidate constellation points;
selecting a second subset of the first subset of candidate constellation points; and
decoding the third data stream based on the second subset of the first subset of candidate constellation points.

9. A method, comprising:
receiving a plurality of data streams at a receiver, each of the plurality of data streams representing a different transmitted data stream; and
decoding at least one of the plurality of data streams based on a subset of candidate constellation points selected from a set of candidate constellation points identified for a different one of the plurality of data streams; and
selecting the subset of candidate constellation points, comprising selecting a threshold number of constellation points, the threshold number is selected based on an order of the plurality of data streams.

* * * * *